US010778129B2

(12) United States Patent
Hotta et al.

(10) Patent No.: US 10,778,129 B2
(45) Date of Patent: Sep. 15, 2020

(54) MOTOR CONTROL DEVICE

(71) Applicant: SANDEN AUTOMOTIVE COMPONENTS CORPORATION, Isesaki-shi, Gunma (JP)

(72) Inventors: Masafumi Hotta, Isesaki (JP); Daisuke Hirono, Isesaki (JP)

(73) Assignee: SANDEN AUTOMOTIVE COMPONENTS CORPORATION, Isesaki-shi, Gunma (JP)

( * ) Notice: Subject to any disclaimer, the term of this patent is extended or adjusted under 35 U.S.C. 154(b) by 332 days.

(21) Appl. No.: 16/063,975

(22) PCT Filed: Jan. 12, 2017

(86) PCT No.: PCT/JP2017/001829
§ 371 (c)(1),
(2) Date: Jun. 19, 2018

(87) PCT Pub. No.: WO2017/130842
PCT Pub. Date: Aug. 3, 2017

(65) Prior Publication Data
US 2020/0204098 A1 Jun. 25, 2020

(30) Foreign Application Priority Data
Jan. 27, 2016 (JP) .................................. 2016-013675

(51) Int. Cl.
*H02P 21/09* (2016.01)
*H02P 21/22* (2016.01)
(Continued)

(52) U.S. Cl.
CPC ............... *H02P 21/09* (2016.02); *F25B 1/00* (2013.01); *H02P 21/22* (2016.02); *H02P 27/12* (2013.01)

(58) Field of Classification Search
CPC ...... H02P 1/00; H02P 1/04; H02P 1/16; H02P 1/163; H02P 1/166; H02P 1/18;
(Continued)

(56) References Cited

U.S. PATENT DOCUMENTS 5,598,081 A    1/1997 Okamura et al.
8,384,327 B2 * 2/2013 Takahashi ........... H02P 21/0003
                                                    318/400.3
(Continued)

FOREIGN PATENT DOCUMENTS

JP    07-143800 A    6/1995
JP    2003-339197 A   11/2003
(Continued)

OTHER PUBLICATIONS

Japan Patent Office, International Search Report issued in International Application No. PCT/JP2017/001829, dated Apr. 4, 2017.
The International Bureau of WIPO, International Preliminary Report on Patentability (Chapter I) issued in International Application No. PCT/JP2017/001829, dated Aug. 9, 2018.

Primary Examiner — Antony M Paul
(74) Attorney, Agent, or Firm — Baker Botts L.L.P.

(57) ABSTRACT

In a motor control device, a voltage phase detecting unit sets a voltage phase of applied voltage to be applied to a motor based on a deviation between a target d-axis current set by a target d-axis current setting unit and an actual d-axis current detected by a rotor position detecting unit and an actual rotational speed detected by a rotational speed detecting unit. Here, a correction amount calculating unit determines whether or not a rotor has rotated by one period of mechanical angle based on the rotor position detected by the rotor position detecting unit and calculates an average value of deviations between target d-axis current and actual d-axis current in each period of mechanical angle as a correction amount, and a second addition/subtraction unit corrects a target d-axis current by a correction amount.

6 Claims, 14 Drawing Sheets

(51) Int. Cl.
*F25B 1/00* (2006.01)
*H02P 27/12* (2006.01)

(58) Field of Classification Search
CPC .... H02P 1/24; H02P 1/26; H02P 1/265; H02P 1/42; H02P 1/423; H02P 1/46; H02P 1/465; H02P 21/00; H02P 6/00; H02P 6/14; H02P 6/185; H02P 7/2815; H02P 7/29; H02P 21/0003; H02P 21/0021; H02P 21/0025; H02P 21/14; H02P 21/22; H02P 21/24; H02P 21/50; H02P 23/00; H02P 23/0027; H02P 23/03; H02P 23/14; H02P 25/00; H02P 25/03; H02P 25/08; H02P 27/00; H02P 27/026; H02P 27/045; H02P 27/04; H02P 27/06; H02P 27/08; H02P 29/00

USPC ..... 318/400.01, 400.02, 700, 701, 721, 727, 318/400, 799, 800, 400.14, 801, 430, 432
See application file for complete search history.

(56) References Cited

U.S. PATENT DOCUMENTS

| | | | |
|---|---|---|---|
| 2009/0021194 A1* | 1/2009 | Tonami | B66B 1/308 318/400.02 |
| 2011/0231066 A1 | 9/2011 | Ohno et al. | |

FOREIGN PATENT DOCUMENTS

| | | |
|---|---|---|
| JP | 2006-288076 A | 10/2006 |
| JP | 2010-057217 A | 3/2010 |
| JP | 2011-010438 A | 1/2011 |
| JP | 2011-194914 A | 10/2011 |
| JP | 2012-170249 A | 9/2012 |

\* cited by examiner

MOTOR CONTROL DEVICE

CROSS-REFERENCE TO RELATED APPLICATIONS

This application is a U.S. National Stage Patent Application under 37 U.S.C. § 371 of International Patent Application No. PCT/JP2017/001829, filed on Jan. 12, 2017, which claims the benefit of Japanese Patent Application No. JP 2016-013675, filed on Jan. 27, 2016, the disclosures of each of which are incorporated herein by reference in their entirety.

TECHNICAL FIELD

The present invention relates to a motor control device that controls the drive of a motor, and more particularly, to a control device for a motor that is controlled by vector control.

BACKGROUND ART

As a conventional motor control device, there is known one that performs current feedback control based on a deviation between a target d-axis current and an actually detected d-axis current (for example, see Patent Document 1).

REFERENCE DOCUMENT LIST

Patent Document

Patent Document 1: Japanese Patent Application Laid-open Publication No. 2012-170249

SUMMARY OF THE INVENTION

Problems to be Solved by the Invention

However, even when current feedback control is performed, if a load change occurs in a motor due to, for example, pulsation in the discharge of refrigerant with compressor to be driven by the motor, the peak current value of each phase current pulsates and the maximum value of the phase current increases as compared with a case in which no load change occurs, which may cause not only the reduction in the efficiency of the motor but also an electrically undesirable impact on an inverter, etc.

Accordingly, in view of the conventional problems described above, an object of the present invention is to provide a motor control device that suppresses the pulsation of the peak current value of each phase current.

Means for Solving the Problems

To achieve the above object, a first aspect of the present invention relates to a motor control device configured to detect a phase current of a motor, set a target d-axis current, detect an actual d-axis current from the detected phase current, and set an applied voltage to be applied to the motor based on a deviation between the set target d-axis current and the detected actual d-axis current, wherein the motor control device calculates an average value of the absolute values of deviations between target d-axis current and actual d-axis current in each predetermined period of time, and sequentially corrects a target d-axis current based on the average value.

Furthermore, a second aspect of the present invention relates to a motor control device configured to detect a phase current of a motor, set a target d-axis current, detect an actual d-axis current from the detected phase current, and set an applied voltage to be applied to the motor based on a deviation between the set target d-axis current and the detected actual d-axis current, wherein the motor control device detects a peak current value, detects a rotational speed, selects, out of correction amounts of target d-axis currents stored in advance in association with a peak current value and a rotational speed, a correction amount corresponding to the detected peak current value and rotational speed, and corrects the target d-axis current based on the selected correction amount.

Effects of the Invention

According to a motor control device of the present invention, it is possible to suppress the pulsation of the peak current value and reduce the maximum value of a phase current.

BRIEF DESCRIPTION OF THE DRAWINGS

FIG. 7A illustrates a phase current waveform before correction, and FIG. 7B illustrates a phase current waveform after correction.

MODE FOR CARRYING OUT THE INVENTION

Embodiments for carrying out the present invention will be described in detail below with reference to accompanying drawings.

First Embodiment

Figure 1:
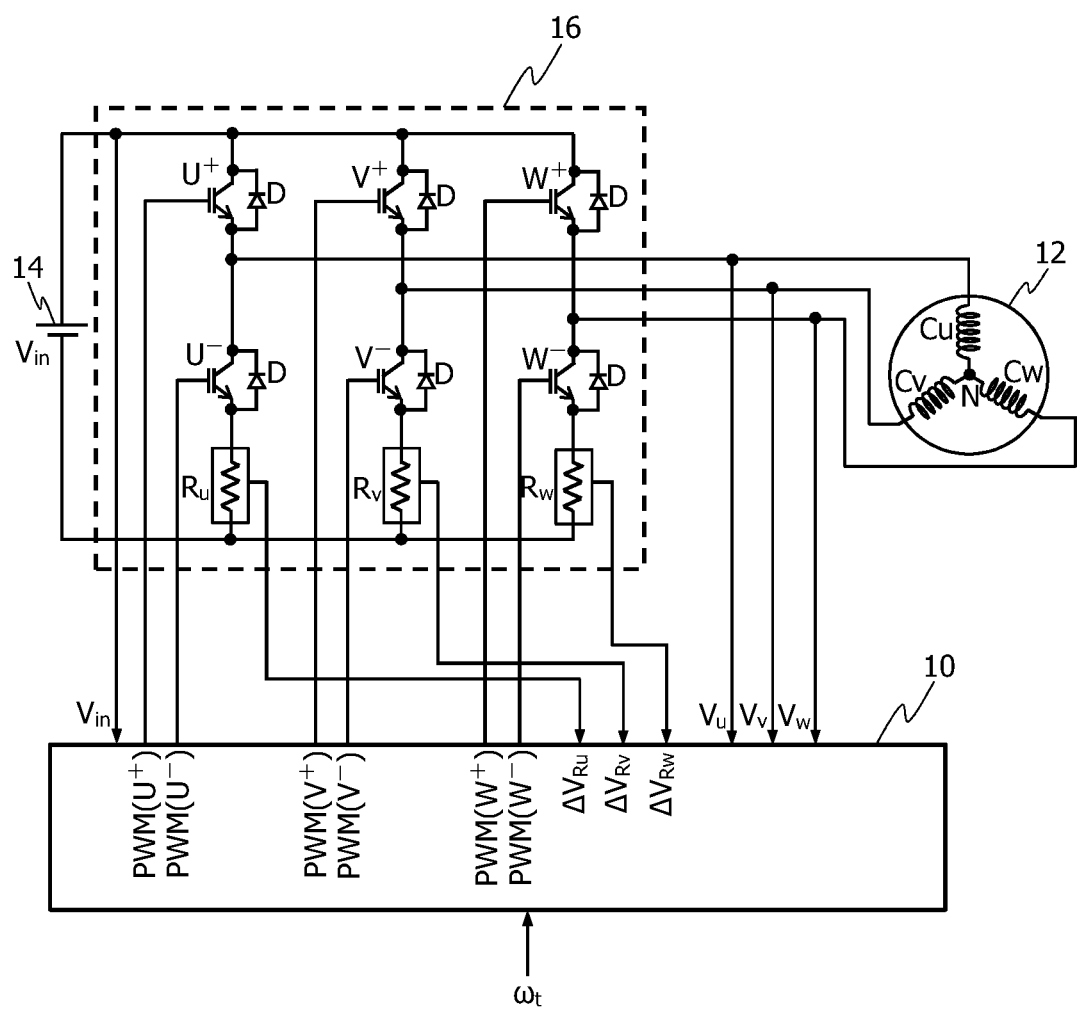
FIG. 1 is a configuration diagram illustrating an example of the application of a motor control device according to a first embodiment.

FIG. 1 is a diagram illustrating an example of a motor control device according to a first embodiment of the present invention.

A motor control device 10 has a function of detecting the position of a rotating rotor of a motor 12 without a sensor, and is for controlling an inverter 16 that supplies electric power from a direct-current power supply 14 to the motor 12. The shaft output of the motor 12 is used for driving various mechanical loads, such as a compressor (not illustrated) that compresses, the refrigerant in a refrigerating cycle of a vehicle air-conditioning device.

The motor 12 is a three-phase brushless motor, and has a stator (not illustrated) including three-phase coils, a U-phase coil Cu, a V-phase coil Cv, and a W-phase coil Cw, and a rotor (not illustrated) including a permanent magnet. The U-phase coil Cu, the V-phase coil Cv, and the W-phase coil Cw are star-connected, where respective one ends are electrically connected to a neutral point N. Note that a stator of which the three-phase coils are delta-connected is also applicable to the motor control device 10.

The inverter 16 includes two switching elements with an antiparallel diode D for each of U-, V-, and W-phases; the two switching elements for each phase are connected in series between the high potential side and the low potential side of the direct-current power supply 14. For the U-phase, an upper-arm-side switching element $U^+$ and a lower-arm-side switching element $U^-$ are provided; for the V-phase, an upper-arm-side switching element $V^+$ and a lower-arm-side switching element $V^-$ are provided; for the W-phase, an upper-arm-side switching element $W^+$ and a lower-arm-side switching element $W^-$ are provided. Each of the switching elements $U^+$, $U^-$, $V^+$, $V^-$, $W^+$, and $W^-$ has a control terminal, and the control terminal receives a pulse width modulation (PWM) signal output from the motor control device 10 to drive the switching element, and in turn, the three-phase coils, the U-phase coil Cu, the V-phase coil Cv, and the W-phase coil Cw, are controlled by sine wave energization (180-degree energization). Note that in the present embodiment, IGBTs are used as the switching elements; however, the switching elements are not limited to these, and transistors, such as MOSFETs and bipolar transistors, and GTOs can also be used.

As for the other ends of the U-phase coil Cu, the V-phase coil Cv, and the W-phase coil Cw of which the one ends are connected to the neutral point N, the U-phase coil Cu is connected between the upper-arm-side switching element $U^+$ and the lower-arm-side switching element $U^-$, the V-phase coil Cv is connected between the upper-arm-side switching element $V^+$ and the lower-arm-side switching element $V^-$, and the W-phase coil Cw is connected between the upper-arm-side switching element $W^+$ and the lower-arm-side switching element $W^-$.

The inverter 16 includes three shunt resistors $R_u$, $R_v$, and $R_w$ for detecting the phase currents flowing through the phases of the motor 12. The shunt resistor $R_u$ lies between the lower-arm-side switching element $U^-$ and the low potential side of the direct-current power supply 14, the shunt resistor $R_v$ lies between the lower-arm-side switching element $V^-$ and the low potential side of the direct-current power supply 14, and the shunt resistor Rw lies between the lower-arm-side switching element $W^-$ and the low potential side of the direct-current power supply 14. Note that a means of detecting the phase currents flowing through the phases of the motor 12 is not limited to the shunt resistor, and various types of current sensors can substitute for shunt resistors.

Furthermore, the requisite number of the current sensors, including the shunt resistances, may be two at most. For example, in a case in which the inverter 16 includes two shunt resistors $R_u$ and $R_v$, a phase current $I_u$ of the U-phase is detected by the shunt resistor $R_u$, and a phase current $I_v$ of the V-phase is detected by the shunt resistor $R_v$, and then a phase current $I_w$ of the W-phase can be calculated by the following equation: $I_w=-I_u-I_v$.

The motor control device 10 receives three signals of voltage drops $\Delta V_{Ru}$, $\Delta V_{Rv}$, and $\Delta V_{Rw}$, which are drops in voltage caused by the shunt resistors $R_u$, $R_v$, and $R_w$ respectively, signals of applied voltages $V_u$, $V_v$, and $V_w$ to be applied to the three-phase coils Cu, Cv, and Cw respectively, a signal of a power supply voltage $V_{in}$ of the direct-current power supply, and an instruction signal of a target rotational speed cot for the motor 12 sent from an external device. Then, the motor control device 10 outputs PWM signals to the switching elements $U^+$, $U^-$, $V^+$, $V^-$, $W^+$, and $W^-$ of the inverter 16 based on these input signals. Although not illustrated in the diagram, the following description is given on the assumption that the motor control device 10 incorporates a computer and storage means, such as a random access memory (RAM) and a read only memory (ROM), and functions of the motor control device 10 to be described later are executed by the computer that reads a preinstalled program and operates. However, the present invention is not limited thereto, and some or all of the functions can be realized by a hardware configuration.

Figure 2:
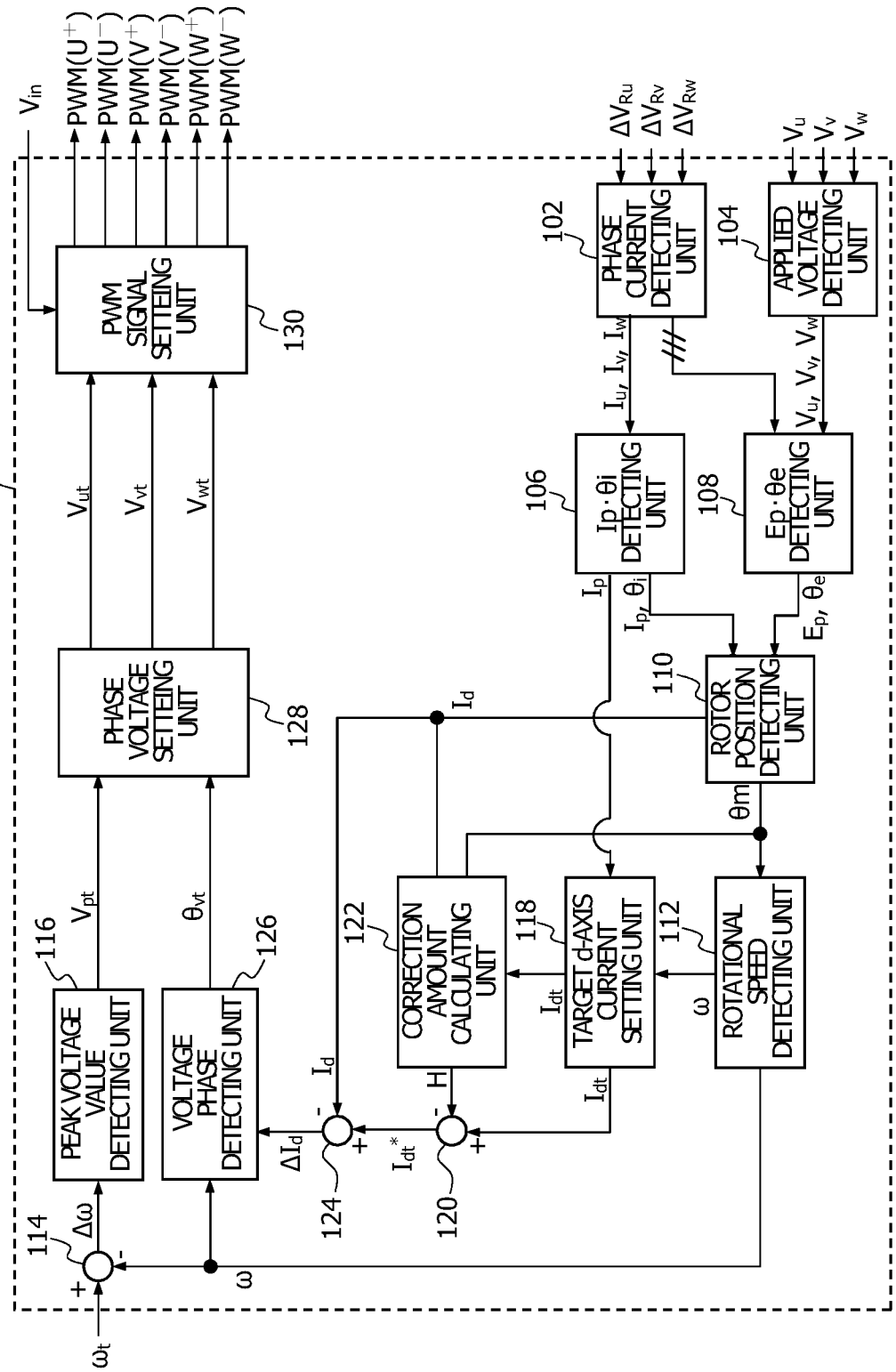
FIG. 2 is a functional block diagram illustrating an example of the motor control device according to the first embodiment.

FIG. 2 is a functional block diagram illustrating an example of the motor control device 10.

The motor control device 10 includes a phase current detecting unit 102, an applied voltage detecting unit 104, a peak current value and current electrical angle (Ip·θi) detecting unit 106, an induced voltage peak value and induced voltage electrical angle (Ep·θe) detecting unit 108, a rotor position detecting unit 110, a rotational speed detecting unit 112, a first addition/subtraction unit 114, a peak voltage value detecting unit 116, a target d-axis current setting unit 118, a second addition/subtraction unit 120, a correction amount calculating unit 122, a third addition/subtraction unit 124, a voltage phase detecting unit 126, a phase voltage setting unit 128, and a PWM signal setting unit 130.

The phase current detecting unit 102 serves as a current detecting means that measures voltage drops $\Delta V_{Ru}$, $\Delta V_{Rv}$, and $\Delta V_{Rw}$, which are drops in voltage caused by the three shunt resistors $R_u$, $R_v$, and $R_w$ respectively, thereby detecting a U-phase current $I_u$ flowing through the U-phase coil Cu, a V-phase current $I_v$ flowing through the V-phase coil $C_v$, and a W-phase current $I_w$ flowing through the W-phase coil Cw.

The applied voltage detecting unit 104 detects a U-phase applied voltage $V_u$ that is applied from the U-phase upper-arm-side switching element $U^+$ to the U-phase coil Cu, a V-phase applied voltage $V_v$ that is applied from the V-phase upper-arm-side switching element $V^+$ to the V-phase coil Cv, and a W-phase applied voltage $V_w$ that is applied from the W-phase upper-arm-side switching element $W^+$ to the W-phase coil Cw.

The Ip·θi detecting unit 106 (a peak current value detecting means) detects a peak current value $I_p$ and a current electrical angle $\theta_i$ based on the values of phase currents $I_u$, $I_v$, and $I_w$ detected by the phase current detecting unit 102. Its detection method is as follows. Note that this detection method is described in detail in Japanese Patent Application Laid-open Publication No. 2011-10438 (hereinafter, referred to as "Reference Document 1").

Figure 3:
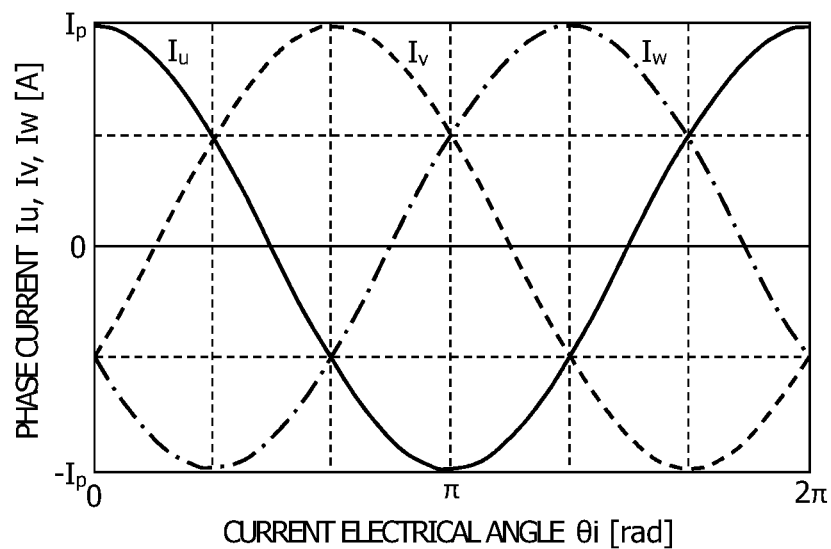
FIG. 3 is an explanatory diagram illustrating ideal waveforms of phase currents in the first embodiment.

As illustrated in a phase current waveform diagram in FIG. 3, between phase currents $I_u$, $I_v$, and $I_w$ upon sine wave energization (180-degree energization) and corresponding peak current value $I_p$ and current electrical angle $\theta_i$, the following relational equations hold true.

$$I_u = I_p \times \cos(\theta_i) \quad \text{(Equation 1)}$$

$$I_v = I_p \times \cos(\theta_i - 2\pi/3) \quad \text{(Equation 2)}$$

$$I_w = I_p \times \cos(\theta_i + 2\pi/3) \quad \text{(Equation 3)}$$

Based on the values of phase currents $I_u$, $I_v$, and $I_w$ detected by the phase current detecting unit 102, a peak current value $I_p$ and a current electrical angle $\theta_i$ are calculated by Equations 1 to 3 and thereby detected.

The Ep·θe detecting unit 108 detects an induced voltage peak value $E_p$ and an induced voltage electrical angle $\theta_e$ based on the values of phase currents $I_u$, $I_v$, and $I_w$ detected by the phase current detecting unit 102 and the values of applied voltages $V_u$, $V_v$, and $V_w$ of the respective phases detected by the applied voltage detecting unit 104.

Figure 4:
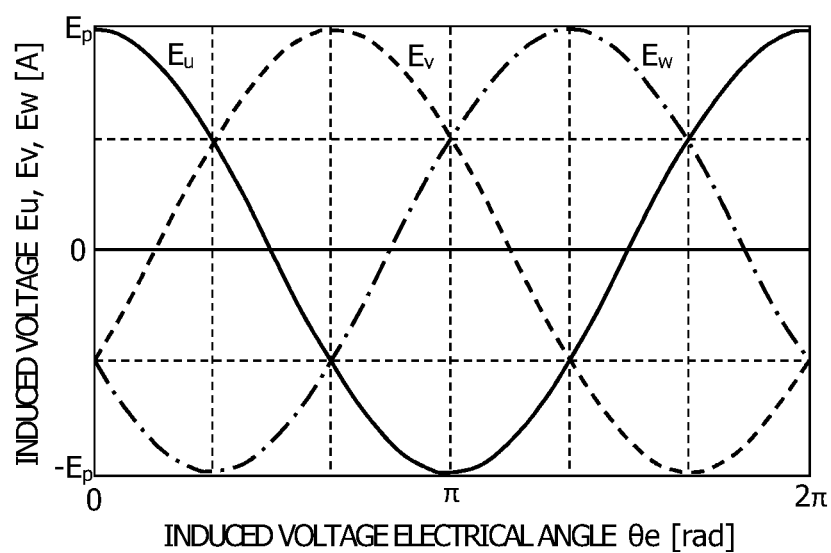
FIG. 4 is an explanatory diagram illustrating ideal waveforms of induced voltages in the first embodiment.

As illustrated in an induced voltage waveform diagram in FIG. 4, between induced voltages $E_u$, $E_v$, and $E_w$ of the respective phases upon sine wave energization and corresponding induced voltage peak value $E_p$ and induced voltage electrical angle $\theta_e$, the following relational equations hold true.

$$E_u = E_p \times \cos(\theta_e) \quad \text{(Equation 4)}$$

$$E_v = E_p \times \cos(\theta_e - 2\pi/3) \quad \text{(Equation 5)}$$

$$E_w = E_p \times \cos(\theta_e + 2\pi/3) \quad \text{(Equation 6)}$$

On the other hand, among the applied voltages $V_u$, $V_v$, and $V_w$, the phase currents $I_u$, $I_v$, and $I_w$, and the induced voltages $E_u$, $E_v$, and $E_w$, the following relational equations hold true:

$$V_u - I_u \times R_{cu} = E_u \quad \text{(Equation 7)}$$

$$V_v - I_v \times R_{cv} = E_v \quad \text{(Equation 8)}$$

$$V_w - I_w \times R_{cw} = E_w \quad \text{(Equation 9)}$$

where $R_{cu}$, $R_{cv}$, and $R_{cw}$ denote known constants of resistances of the U-phase coil Cu, the V-phase coil Cv, and the W-phase coil Cw, respectively.

Based on the values of phase currents $I_u$, $I_v$, and $I_w$ detected by the phase current detecting unit 102 and the values of applied voltages $V_u$, $V_v$, and $V_w$ of the respective phases detected by the applied voltage detecting unit 104, the Ep·θe detecting unit 108 calculates a U-phase induced voltage $E_u$, a V-phase induced voltage $E_v$, and a W-phase induced voltage $E_w$ from Equations 7 to 9. Then, based on the calculated values of U-phase induced voltage $E_u$, V-phase induced voltage $E_v$, and W-phase induced voltage $E_w$, an induced voltage peak value $E_p$ and an induced voltage electrical angle θe are calculated from Equations 4 to 6 and thereby detected.

The rotor position detecting unit 110 detects a rotor position $\theta_m$ based on the peak current value $I_p$ and current electrical angle $\theta_i$ detected by the Ip·θi detecting unit 106 and the induced voltage peak value $E_p$ and induced voltage electrical angle θe detected by the Ep·θe detecting unit 108. The rotor position $\theta_m$ of the motor 12 is detected by using a rotor position equation including the current electrical angle $\theta_i$ and the current phase β as variables or a rotor position equation including the induced voltage electrical angle $\theta_e$ and the induced voltage phase γ as variables. The current phase β or the induced voltage phase γ is defined in advance by at least two of the following elements: [peak current value $I_p$], [induced voltage peak value $E_p$], and [induced voltage electrical angle $\theta_e$—current electrical angle $\theta_i$] (see Reference Document 1 for details).

Described below is, as an example, a method of detecting the rotor position $\theta_m$ by a rotor position equation with the current electrical angle $\theta_i$ and the current phase β defined by the two elements, [peak current value $I_p$] and [induced voltage electrical angle $\theta_e$—current electrical angle $\theta_i$], as variables. In this method, the rotor position equation is given by:

$$\theta_m = \theta_i - \beta - 90° \quad \text{(Equation 10)}$$

The current phase β in Equation 10 is selected by referring to a current phase β data table stored in advance in the ROM or the like in association with the two elements: [peak current value $I_p$] and [induced voltage electrical angle $\theta_e$—current electrical angle $\theta_i$]. This current phase β data table is created as follows.

Figure 5:
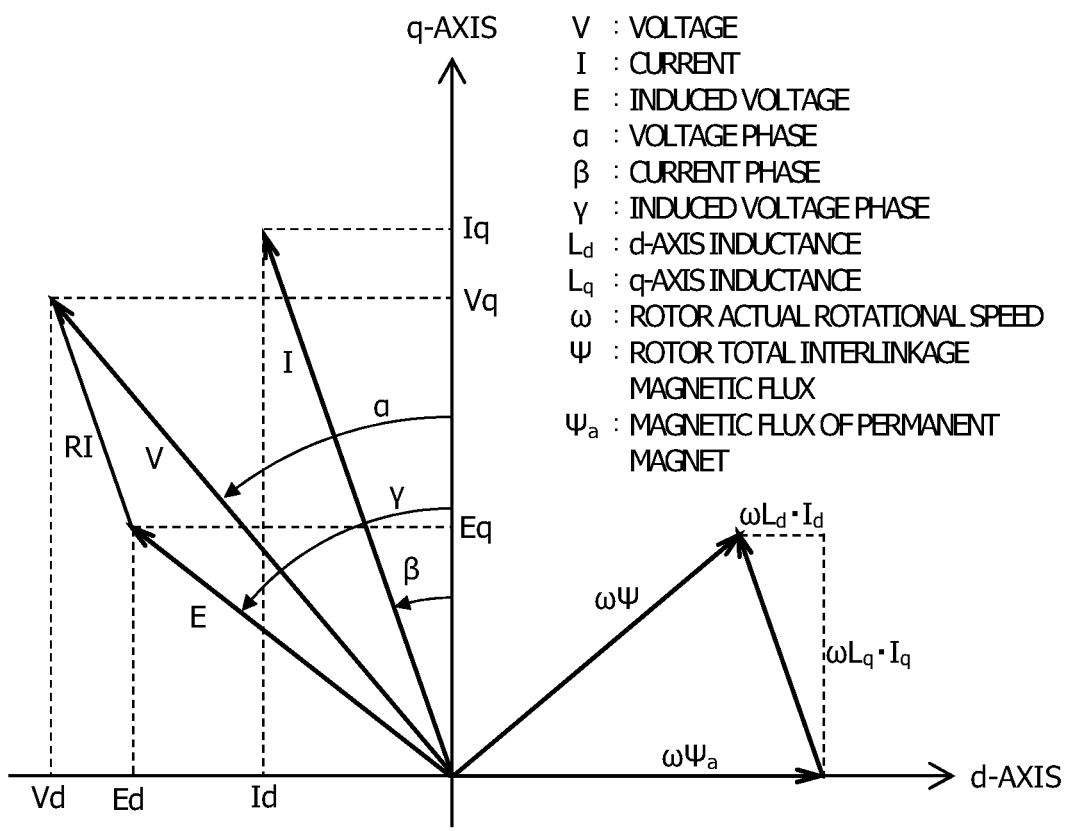
FIG. 5 is a motor vector diagram in the first embodiment.

Regarding the establishment of the current phase β data table, FIG. 5 illustrates a motor vector diagram when the rotor of the motor 12 is rotating, where a relationship among the applied voltage V ($V_u$, $V_v$, $V_w$), the current I ($I_u$, $I_v$, $I_w$), and the induced voltage E ($E_u$, $E_v$, $E_w$) is represented by a vector on the dq coordinate system. In the dq coordinate system, the d-axis indicates the direction of the field rotating in synchronization with the rotor of the motor 12, and the q-axis indicates the direction of torque generation perpendicular to this d-axis. In the diagram, Ed denotes a d-axis component of the induced voltage E; Eq denotes a q-axis component of the induced voltage E; Id denotes a d-axis component of the current I; Iq denotes a q-axis component of the current I; Vd denotes a d-axis component of the applied voltage V; and Vq denotes a q-axis component of the applied voltage V. Furthermore, α denotes a voltage phase with reference to the q-axis; β denotes a current phase with reference to the q-axis; and γ denotes an induced voltage phase with reference to the q-axis. Moreover, $\psi_a$ in the diagram denotes a magnetic flux of the permanent magnet of the rotor; $L_d$ denotes a d-axis inductance; $L_q$ denotes a q-axis inductance; R denotes a resistance value of the coils Cu, Cv, and Cw of the stator; and ψ denotes the total interlinkage magnetic flux of the rotor.

In this motor vector diagram, the following relational equation holds true:

$$\begin{pmatrix} Vd \\ Vq \end{pmatrix} = \begin{pmatrix} R & -\omega Lq \\ \omega Ld & R \end{pmatrix} \begin{pmatrix} Id \\ Iq \end{pmatrix} + \begin{pmatrix} 0 \\ \omega \psi a \end{pmatrix} \quad \text{(Equation 11)}$$

where ω denotes the rotational speed of the rotor, and, by using the d-axis component Ed and the q-axis component Eq of the induced voltage E, the following relational equation holds true.

$$\begin{pmatrix} Ed(=Vd-R\cdot Id) \\ Eq(=Vq-R\cdot Iq) \end{pmatrix} = \begin{pmatrix} 0 & -\omega Lq \\ \omega Ld & 0 \end{pmatrix} \begin{pmatrix} Id \\ Iq \end{pmatrix} + \begin{pmatrix} 0 \\ \omega \psi a \end{pmatrix} \quad \text{(Equation 12)}$$

In this way, the data table is created on the assumption that Equations 11 and 12 hold true in the motor vector diagram in FIG. 5. That is, a current phase β data table defining [peak current value $I_p$] corresponding to [current I] and [induced voltage electrical angle $\theta_e$—current electrical angle $\theta_i$] corresponding to [induced voltage phase γ—current phase β] as elements is created by increasing the current phase β and the current I illustrated in the motor vector diagram in stages within a predetermined range and storing the current phase β when [induced voltage phase γ—current phase β] is a predetermined value.

The rotor position detecting unit 110 selects a current phase β by referring to the current phase β data table based on the peak current value $I_p$ and current electrical angle $θ_i$ detected by the Ip·θi detecting unit 106, and detects a rotor position $θ_m$ by substituting the selected current phase β and the current electrical angle $θ_i$ into Equation 10.

Furthermore, the rotor position detecting unit 110 serves as a d-axis current detecting means that detects an actual d-axis current (an estimated value, the same applies hereafter) $I_d$ based on the peak current value $I_p$ and the current phase β apart from the rotor position $θ_m$. Specifically, the actual d-axis current Id is detected by calculating the following Equation 13.

$$I_d = I_p × \sin(β) \quad (Equation\ 13)$$

The rotational speed detecting unit 112 calculates an actual rotational speed ω from $dθ_m/dt$ based on the rotor position $θ_m$ detected by the rotor position detecting unit 110. For example, the rotational speed detecting unit 112 calculates an actual rotational speed ω as below. The rotational speed detecting unit 112 subtracts the rotor position $θ_m(n-1)$ detected in the calculation for the last period from the latest rotor position $θ_m(n)$ detected by the rotor position detecting unit 110 to thereby find a rotor position change amount $Δθ_m$ and applies a predetermined filter to a value ($Δθ_m/Δt$) obtained by dividing the rotor position change amount $Δθ_m$ by one calculation period Δt.

The actual rotational speed co detected by the rotational speed detecting unit 112 (a rotational speed detecting means) is sent to the first addition/subtraction unit 114 so as to feed it back to the target rotational speed cot of the motor 12 that the motor control device 10 is instructed to have, and the first addition/subtraction unit 114 calculates a rotational speed deviation Δω between the target rotational speed cot and the actual rotational speed ω.

The peak voltage value detecting unit 116 detects a peak voltage value $V_{pt}$ of voltage applied to the motor 12 by a process such as P control or PI control based on the rotational speed deviation Δω calculated by the first addition/subtraction unit 114.

The target d-axis current setting unit 118 serves as a target d-axis current setting means that sets a target d-axis current $I_{dt}$, for example, so that the generated torque of the motor 12 to the phase current is maximized by current vector control called maximum torque current control. Specifically, the target d-axis current $I_{dt}$ is set by referring to a target d-axis current $I_{dt}$ data table stored in advance in the ROM or the like based on the peak current value $I_p$ detected by the Ip·θi detecting unit 106 and the actual rotational speed ω detected by the rotational speed detecting unit 112.

The target d-axis current $I_{dt}$ data table used here defines the target d-axis current $I_{dt}$ with [peak current value $I_p$] as parameters. The creation of the target d-axis current $I_{dt}$ data table is performed on the assumption that Equations 11 and 12 hold true in the motor vector diagram in FIG. 5 and that the generated torque of the motor 12 to the phase current is maximized by current vector control of maximum torque current control. Under this assumption, the target d-axis current $I_{dt}$ data table defining [peak current value $I_p$] corresponding to [current I] and [rotational speed ω] as parameters is created by increasing the current phase β and the current I illustrated in the motor vector diagram in stages within a predetermined range and storing a locus of a current vector composed of the current phase β and the current I.

Specifically, the target d-axis current $I_{dt}$ is calculated by the following relational equation with the peak current value $I_p$, the rotational speed ω, and a coefficient a as parameters.

$$I_{dt} = a × f(I_p, ω) \quad (Equation\ 14)$$

The second addition/subtraction unit 120 subtracts a correction amount H calculated by the correction amount calculating unit 122 from the target d-axis current $I_{dt}$ set by the target d-axis current setting unit 118 to thereby correct the target d-axis current $I_{dt}$ and obtain a corrected target d-axis current $I_{dt}*$. Then, in order to feed back the actual d-axis current $I_d$ detected by the rotor position detecting unit 110 to the corrected target d-axis current $I_{dt}*$, the third addition/subtraction unit 124 calculates a d-axis current deviation $ΔI_d$ that is a deviation between the corrected target d-axis current $I_{dt}*$ and the actual d-axis current $I_d$. Note that the calculation of the correction amount H by the correction amount calculating unit 122 is described later.

Figure 6:
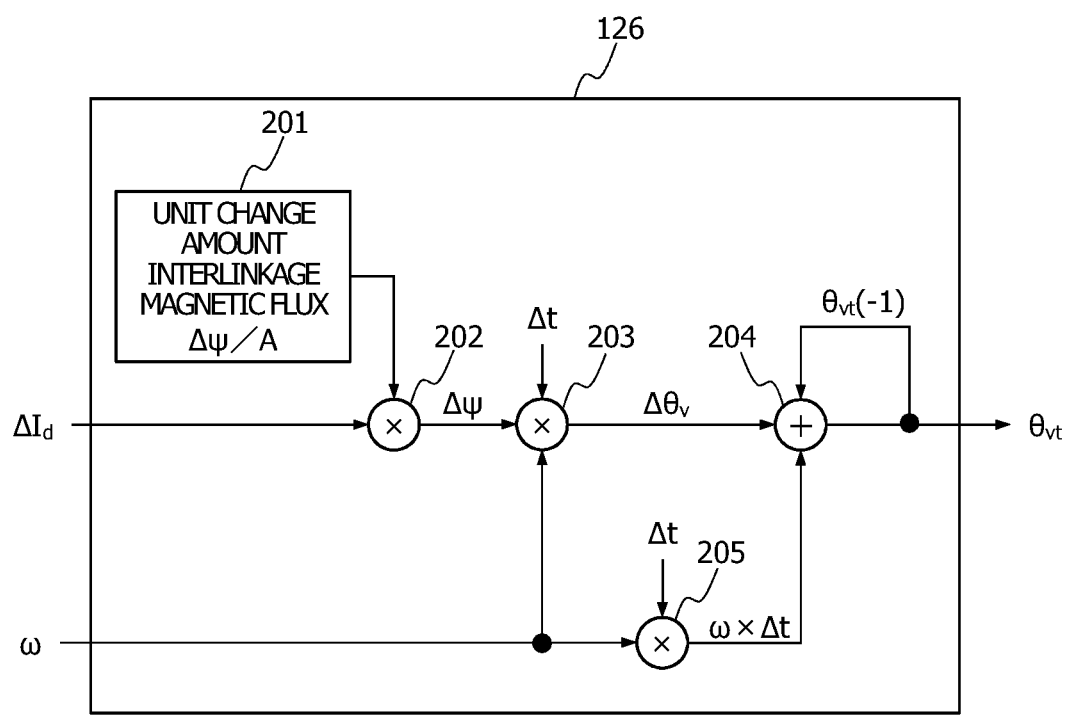
FIG. 6 is a functional block diagram of a voltage phase detecting unit in the first embodiment.

The voltage phase detecting unit 126 serves as an applied voltage detecting means that detects a voltage phase $θ_{vt}$ of voltage to be applied to the motor 12 based on the actual rotational speed co detected by the rotational speed detecting unit 112 and the d-axis current deviation $ΔI_d$ calculated by the third addition/subtraction unit 124. FIG. 6 illustrates a functional block diagram of the voltage phase detecting unit 126.

The voltage phase detecting unit 126 stores, as one of motor parameters, a unit change amount Δϕ/A [%] of an interlinkage magnetic flux ϕ when the d-axis current Id has changed by 1 A (ampere) in a ϕ change amount storage unit 201, and a first multiplication unit 202 multiplies the unit change amount Δϕ/A stored in the ϕ change amount storage unit 201 by the d-axis current deviation $ΔI_d$ calculated by the third addition/subtraction unit 124, whereby an interlinkage magnetic flux change amount Δϕ according to the d-axis current deviation $ΔI_d$ is calculated. A second multiplication unit 203 multiplies the calculated interlinkage magnetic flux change amount Δϕ by the actual rotational speed w and one calculation period Δt, and thus calculates an angle change $Δθ_v$ (=Δϕ×ω×Δt). An addition unit 204 calculates a voltage phase $θ_{vt}$ by adding ω×Δt that a third multiplication unit 205 has multiplied the actual rotational speed ω by one calculation period Δt, the angle change $Δθ_v$ calculated by the second multiplication unit 203, and an angle change $Δθ_v(-1)$ calculated in the last calculation period. Therefore, the voltage phase $θ_{vt}$ is found by the following Equation 15.

$$θ_{vt} = θ_{vt}(-1) + [ω×Δt] + Δθ_v \quad (Equation\ 15)$$

The phase voltage setting unit 128 sets a U-phase application set voltage $V_{ut}$ to be applied to the U-phase coil Cu of the motor 12, a V-phase application set voltage $V_{vt}$ to be applied to the V-phase coil Cv, and a W-phase application set voltage $V_{wt}$ to be applied to the W-phase coil Cw based on the peak voltage value $V_{pt}$ detected by the peak voltage value detecting unit 116 and the voltage phase $θ_{vt}$ detected by the voltage phase detecting unit 126.

The PWM signal setting unit 130 sets a duty defining the on/off ratio in PWM signals [PWM(U+), PWM(U−), PWM(V+), PWM(V−), PWM(W+), PWM(W−)] output to the switching elements U+, U−, V+, V−, W+, and W− of the inverter 16 based on the power supply voltage $V_{in}$ of the direct-current power supply, the U-phase application set voltage $V_{ut}$, the V-phase application set voltage $V_{vt}$, and the W-phase application set voltage $V_{wt}$. Thus, the three-phase coils, the U-phase coil Cu, the V-phase coil Cv, and the W-phase coil Cw, are controlled by sine wave energization (180-degree energization), thereby causing the motor 12 to run at the target rotational speed ωt.

Here, the correction amount calculating unit 122 calculates a correction amount H based on the target d-axis current $I_{dt}$ set by the target d-axis current setting unit 118, the actual d-axis current $I_d$ and the rotor position $θ_m$ detected by the rotor position detecting unit 110. Therefore, the correction amount calculating unit 122 and the second addition/subtraction unit 120 serve as a correction means of correcting the target d-axis current $I_{dt}$ set by the target d-axis current setting unit 118 to the corrected target d-axis current $I_{dt}*$.

Figure 7A:
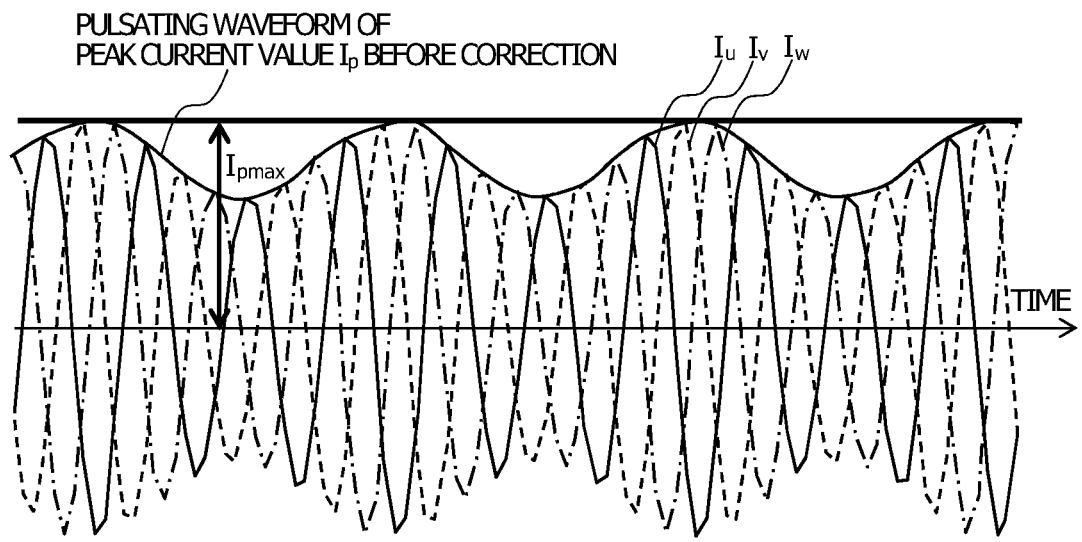
FIGS. 7A and 7B are phase current waveform diagrams illustrating the effect of the motor control device according to the first embodiment.
Figure 7B:
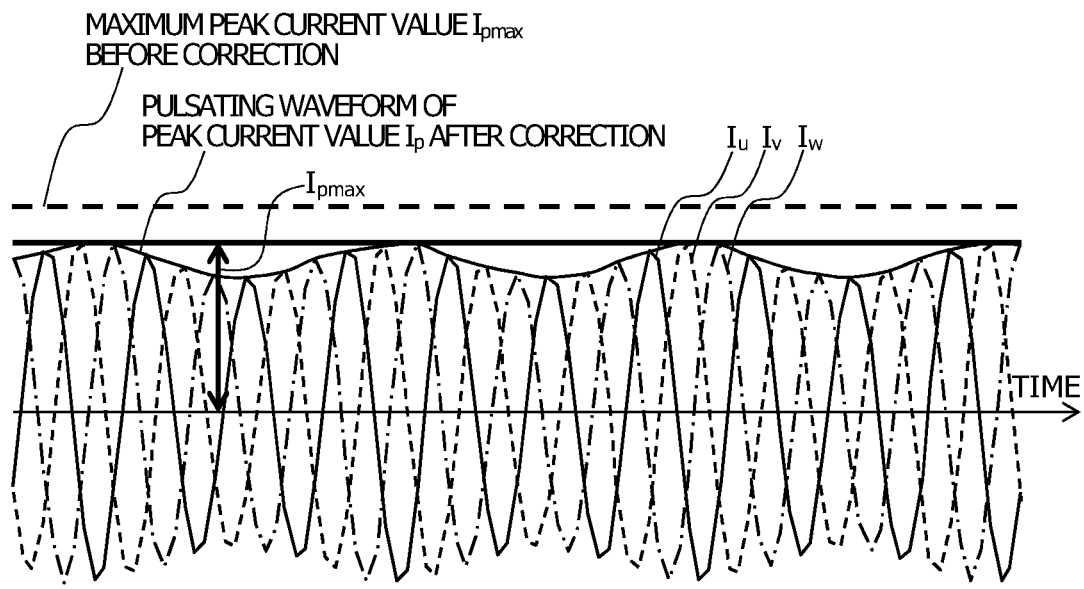

The following is the reason why the target d-axis current $I_{dt}$ is corrected by the correction amount H calculated by the correction amount calculating unit 122. That is, if a load change occurs in the motor 12 due to, for example, the generation of pulsation in the discharge of refrigerant from a compressor to be driven by the motor 12, as illustrated in FIG. 7A, the peak current value $I_p$ that is the peak value of the phase currents $I_u$, $I_v$, and $I_w$ pulsates, and the maximum peak current value $I_{pmax}$ that is the maximum value of the peak current value $I_p$ also increases as compared with a case in which no load change occurs, which may cause not only the reduction in the efficiency of the motor 12 but also an electrically undesirable impact on the inverter 16, an external device, etc. Accordingly, a correction amount H of the target d-axis current $I_{dt}$ is calculated based on an average value of the absolute values of deviations between target d-axis current $I_{dt}$ and actual d-axis current $I_d$ in a predetermined period of time, and the target d-axis current $I_{dt}$ is corrected by the correction amount H, thereby suppressing the pulsation of the peak current value $I_p$ and reducing the maximum peak current value $I_{pmax}$ as illustrated in FIG. 7B.

FIGS. 8 to 12 illustrate a process of calculating a correction amount H repeatedly performed by the correction amount calculating unit 122, and illustrate five different calculation methods.

[First Calculation Method of Correction Amount H]

A first calculation method of the correction amount H is that an absolute average value AVE, which is an average value of the absolute values of deviations between the target d-axis current $I_{dt}$ and the actual d-axis current $I_d$ in one period of mechanical angle, is set as a correction amount H of the target d-axis current $I_{dt}$ set in the next one period of mechanical angle.

Figure 8:
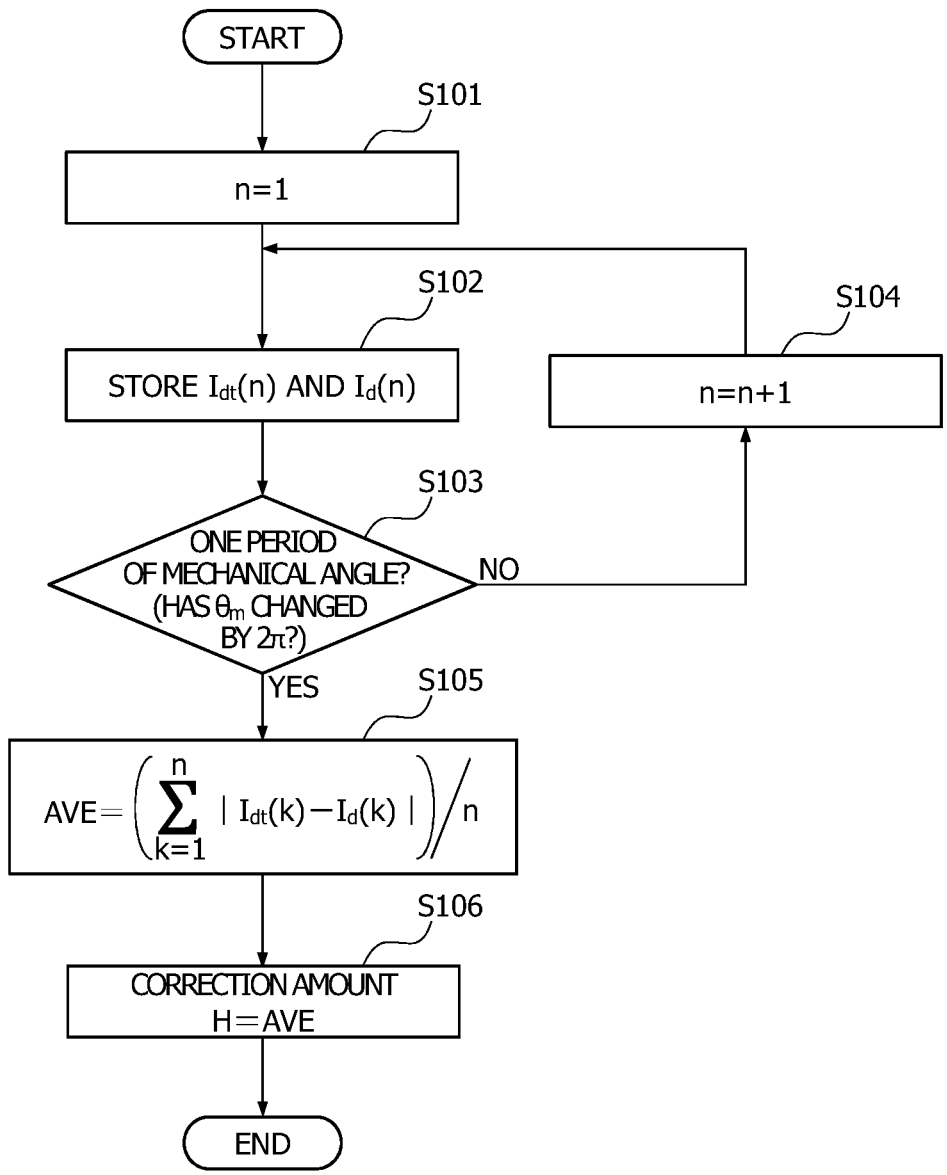
FIG. 8 is a flowchart illustrating a first calculation method in the first embodiment.

FIG. 8 is a flowchart illustrating an example of the first calculation method of the correction amount H. Note that the correction amount H is set to 0 as default.

At step S101 (abbreviated as "S101" in the flowchart, the same applies hereafter), in one period of mechanical angle, a period number n (n=1, 2, 3, . . . ) indicating a number of a calculation period Δt when the target d-axis current $I_{dt}$ and the actual d-axis current $I_d$ have been stored at step S102 to be described below is set to 1.

At step S102, in one period of mechanical angle, the actual d-axis current $I_d$ and the target d-axis current $I_{dt}$ are stored in a storage means such as the RAM in each calculation period Δt. The actual d-axis current $I_d$ and the target d-axis current $I_{dt}$ are stored in association with a period number n as [$I_{dt}(n)$, $I_d(n)$].

At step S103, it is determined whether or not the rotor of the motor 12 has rotated by one period of mechanical angle, i.e., 2π [rad] after the above-described step S101. For example, it is determined by whether or not the rotor position $θ_m$ detected by the rotor position detecting unit 110 has changed by 2π [rad].

If it has been determined at step S103 that the rotor of the motor 12 has rotated by one period of mechanical angle (Yes), the process advances to step S105 to calculate a correction amount H; on the other hand, if it has been determined that the rotor of the motor 12 has not rotated by one period of mechanical angle (No), the process advances to step S104 to store the actual d-axis current $I_d$ and the target d-axis current $I_{dt}$ in the next calculation period Δt, and the current period number n is incremented by one.

At step S105, an absolute average value AVE is calculated.

Specifically, an absolute value $|I_{dt}-I_d|$ of a deviation is calculated at every period number n based on the actual d-axis currents $I_d$ and target d-axis currents $I_{dt}$ for one period of mechanical angle stored in association with the period number n at the above-described step S102, and absolute values of deviations for the one period of mechanical angle are added up. Then, their total value is divided by the value of the latest period number n when it has been determined at the above-described step S103 that the rotor has rotated by one period of mechanical angle, whereby the absolute average value AVE is calculated.

At step S106, the absolute average value AVE calculated at the above-described step S105 is set as a correction amount H, and this correction amount H is held until the rotor has rotated by the next one period of mechanical angle (or the next correction amount H has been calculated at step S105).

[Second Calculation Method of Correction Amount H]

Subsequently, a second calculation method of the correction amount H is that an absolute average value AVE, which is an average value of the absolute values of deviations between the target d-axis current $I_{dt}$ and the actual d-axis current $I_d$ in one period of mechanical angle, is set as a correction amount H of the target d-axis current $I_{dt}$ set in the next one period of mechanical angle just like the first calculation method; however, the second calculation method differs from the first calculation method in that the actual d-axis current $I_d$ and target d-axis current $I_{dt}$ used in the calculation of an absolute value of a deviation are stored (sampled) at the timing at which the actual d-axis current $I_d$ has been estimated to be the peak value. Accordingly, the correction of the target d-axis current $I_{dt}$ is made more accurately according to a change in the actual peak current value $I_p$.

Figure 9:
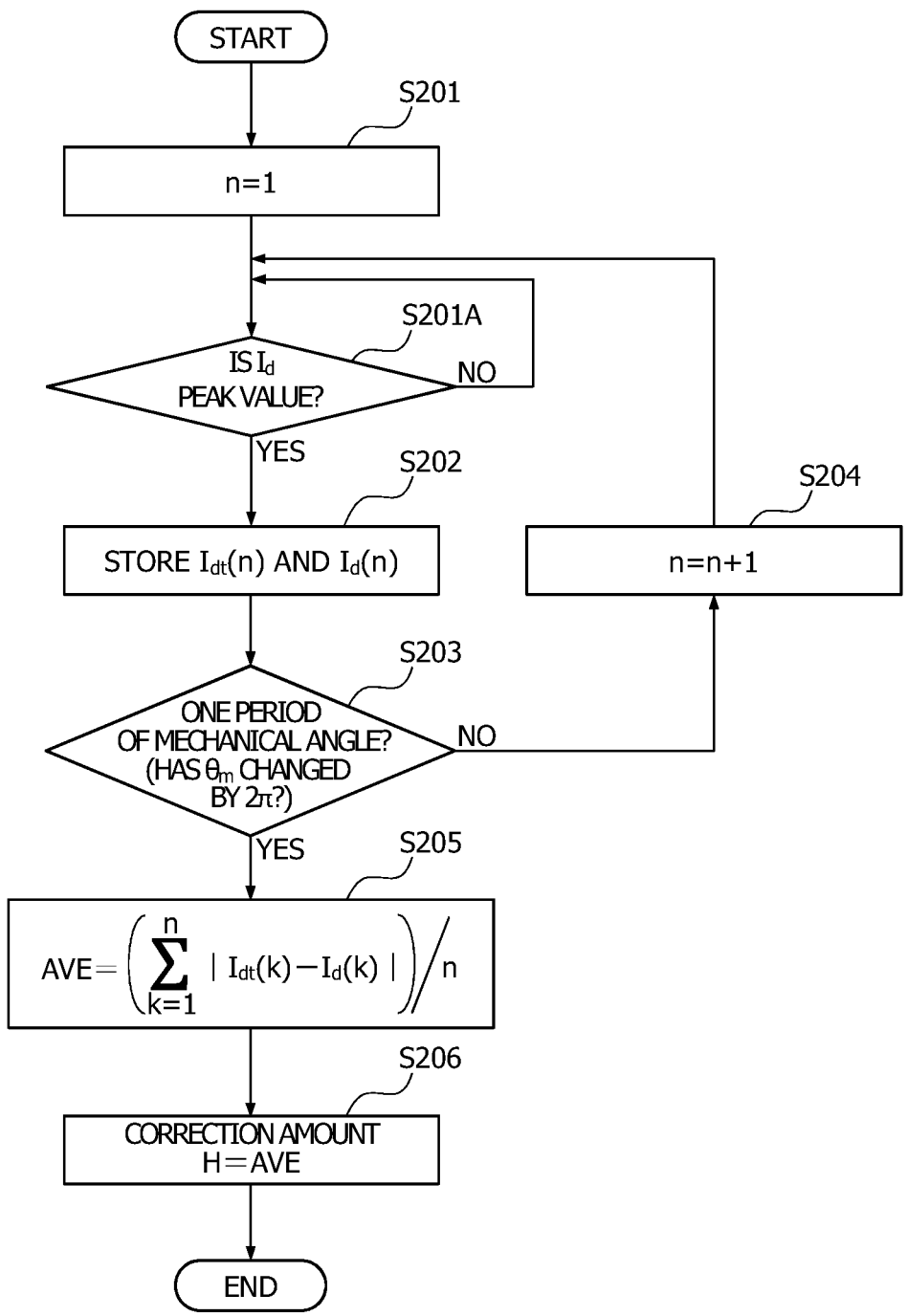
FIG. 9 is a flowchart illustrating a second calculation method in the first embodiment.

FIG. 9 is a flowchart illustrating an example of the second calculation method of the correction amount H. Steps S201 to S206 in the flowchart in FIG. 9 illustrating an example of the second calculation method correspond to steps S101 to S106 in the flowchart in FIG. 8 illustrating an example of the first calculation method, respectively; however, step S201A is added between step S201 and step S202.

After step S201 has been done, at step S201A, whether or not the actual d-axis current $I_d$ detected by the rotor position detecting unit 110 is the peak value (including its approximate value) is determined. For example, if it has been determined that the actual d-axis current $I_d$ was shifted from increasing to decreasing, or if the actual d-axis current $I_d$ has been shifted from decreasing to increasing, the actual d-axis current $I_d$ is estimated to become the peak value.

If it has been determined at step S201A that the actual d-axis current $I_d$ is the peak value (Yes), the process advances to step S202 to store the target d-axis current $I_{dt}$ and the actual d-axis current $I_d$ in the RAM or the like; on the other hand, if it has been determined that the actual d-axis current $I_d$ is not the peak value (No), the present step is repeated.

After step S202 has been done, if it has been determined at step S203 that the rotor has not rotated by one period of mechanical angle (No), the process advances to step S204, and, after that, returns to step S201A to store the target d-axis current $I_{dt}$ and the actual d-axis current $I_d$ at the next timing at which the actual d-axis current $I_d$ is estimated to become the peak value. If it has been determined at step S203 that the rotor has rotated by one period of mechanical angle (Yes), the process advances to step S205, and an absolute average value AVE is calculated in the same manner as step S105. At step S206, the absolute average value AVE is set as a correction amount H of the target d-axis current $I_{dt}$ in the next one period of mechanical angle.

[Third Calculation Method of Correction Amount H]

Subsequently, a third calculation method of the correction amount H is that an absolute average value AVE based on the target d-axis current $I_{dt}$ and the actual d-axis current $I_d$ during a predetermined time $T(\omega)$ according to the actual rotational speed $\omega$ is set as a correction amount H of the target d-axis current $I_{dt}$ set during the next predetermined time $T(\omega)$. In short, comparing the third calculation method with the first calculation method, they differ in that in the first calculation method, the calculation of an absolute average value AVE set as a correction amount H is performed on the target d-axis current $I_{dt}$ and the actual d-axis current Id stored in one period of mechanical angle; on the other hand, in the third calculation method, it is performed on the target d-axis current $I_{dt}$ and the actual d-axis current $I_d$ stored during the predetermined time $T(\omega)$.

Figure 10:
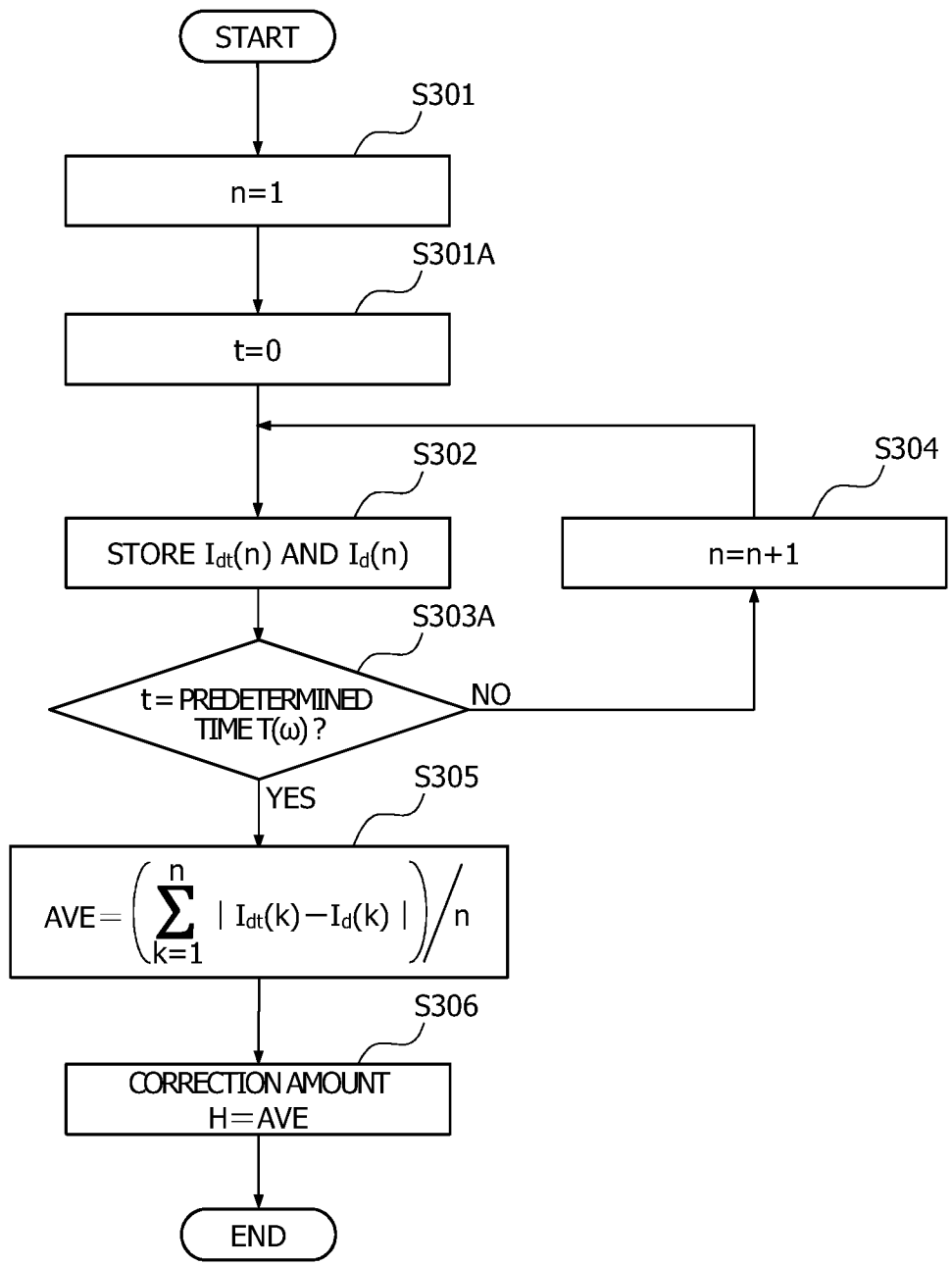
FIG. 10 is a flowchart illustrating a third calculation method in the first embodiment.

FIG. 10 is a flowchart illustrating an example of the third calculation method of the correction amount H.

Comparing the flowchart in FIG. 10 illustrating an example of the third calculation method with the flowchart in FIG. 8 illustrating an example of the first calculation method, the third calculation method differs from the first calculation method in that step S301A is added between step S101 and step S102, and the processing of step S103 is changed to that of step S303A.

After step S301 has been done, at step S301A, time t is set to 0 as default, and, at step S302, the target d-axis current $I_{dt}$ and the actual d-axis current $I_d$ are stored, and after that, at step S303A, whether or not the time t has reached the predetermined time $T(\omega)$ is determined.

The predetermined time $T(\omega)$ is, as described above, a time set according to the actual rotational speed $\omega$; for example, the higher the actual rotational speed $\omega$, the shorter a predetermined time $T(\omega)$ is set, and on the other hand, the lower the actual rotational speed $\omega$, the longer a predetermined time $T(\omega)$ is set. The higher the actual rotational speed $\omega$, the shorter the pulsating period in which the peak current value $I_p$ pulsates, and on the other hand, the lower the actual rotational speed $\omega$, the longer the pulsating period of the peak current value $I_p$. Thus, by calculating an absolute average value AVE for at least one pulsating period, a correction amount H of the target d-axis current $I_{dt}$ according to a change in the peak current value $I_p$ is calculated. Note that instead of the predetermined time $T(\omega)$ set according to the actual rotational speed $\omega$, a predetermined time $T(\omega t)$ set according to the target rotational speed $\omega t$ may be used.

If it has been determined at step S303A that the time t has not reached the predetermined time $T(\omega)$ (No), the process advances to step S304, and after that, returns to step S302. If it has been determined at step S303A that the time t has reached the predetermined time $T(\omega)$ (Yes), the process advances to step S305, and an absolute average value AVE is calculated in the same manner as step S105. At step S306, the absolute average value AVE is set as a correction amount H of the target d-axis current $I_{dt}$ during the next predetermined time $T(\omega)$.

[Fourth Calculation Method of Correction Amount H]

Subsequently, a fourth calculation method of the correction amount H is that the calculation of an absolute average value AVE set as a correction amount H is performed during each predetermined time $T(\omega)$ just like the third calculation method; however, the fourth calculation method differs from the third calculation method in that the actual d-axis current $I_d$ and the target d-axis current $I_{dt}$ used in the calculation of an absolute value of a deviation are stored (sampled) at the timing at which the actual d-axis current $I_d$ is estimated to become the peak value. Accordingly, just like the second calculation method, the correction of the target d-axis current $I_{dt}$ is made more accurately according to a change in the actual peak current value $I_p$.

Figure 11:
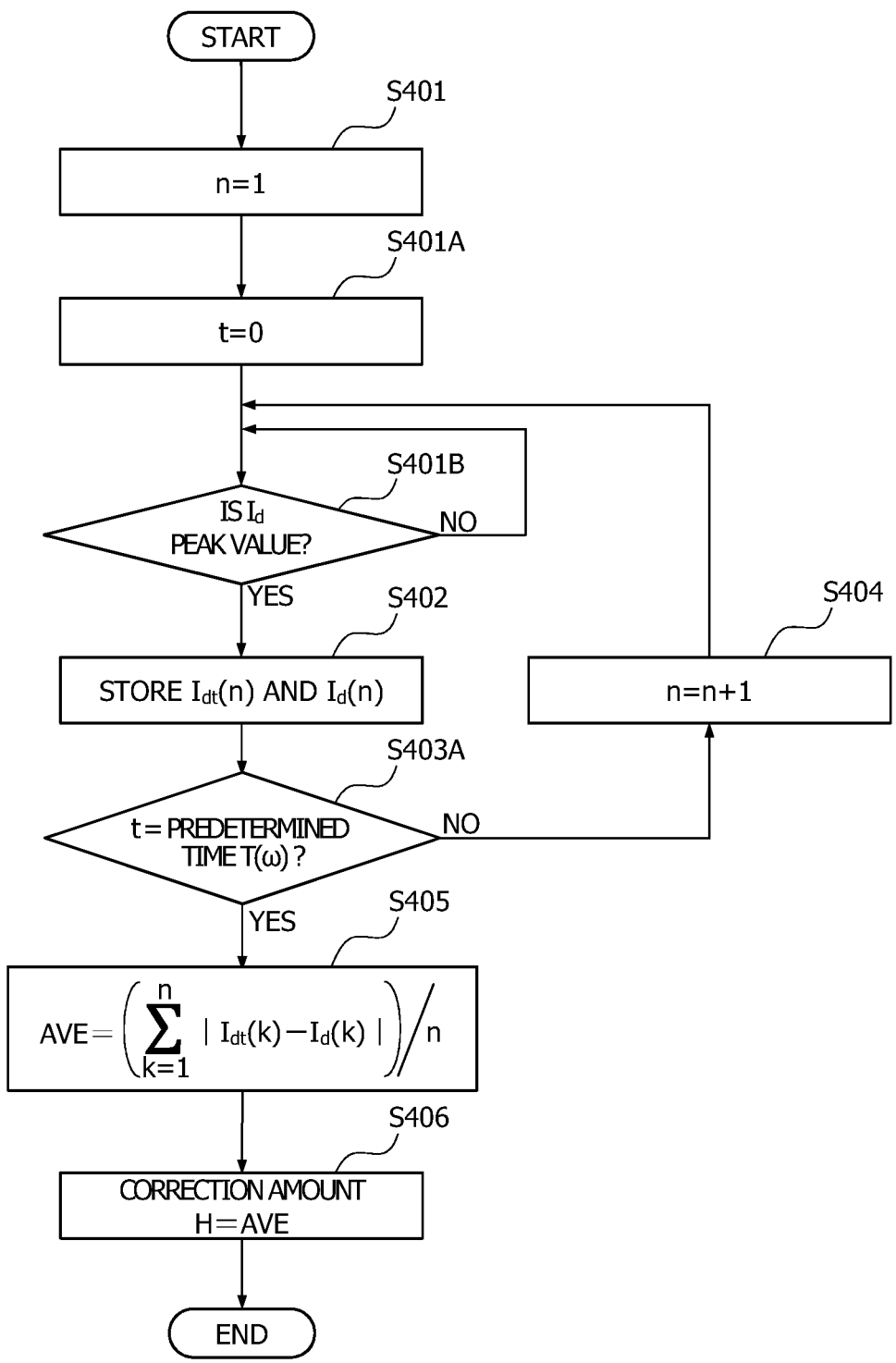
FIG. 11 is a flowchart illustrating a fourth calculation method in the first embodiment.

FIG. 11 is a flowchart illustrating an example of the fourth calculation method of the correction amount H.

Steps S401 to S406 in the flowchart in FIG. 11 illustrating an example of the fourth calculation method correspond to steps S301 to S306 in the flowchart in FIG. 10 illustrating an example of the third calculation method, respectively; however, the fourth calculation method differs from the third calculation method in that step S401B is added between step S301A and step S302. As step S401B is the same process as that of step S201A in the second calculation method, description of step S401B is omitted.

After step S402 has been done, if it has been determined at step S403A that the time t has not reached the predetermined time $T(\omega)$ (No), the process advances to step S404, and after that, returns to step S401B. If it has been determined at step S403A that the time t has reached the predetermined time $T(\omega)$ (Yes), the process advances to step S405, and an absolute average value AVE is calculated in the same manner as step S305. At step S406, the absolute average value AVE is set as a correction amount H of the target d-axis current $I_{dt}$ during the next predetermined time $T(\omega)$.

[Fifth Calculation Method of Correction Amount H]

Subsequently, a fifth calculation method of the correction amount H is that each time the target d-axis current $I_{dt}$ and the actual d-axis current $I_d$ are newly stored in each calculation period $\Delta t$, the moving average, i.e., an absolute average value $AVE_m$ of the target d-axis current $I_{dt}$ and actual d-axis current $I_d$ of the latest sample number $N_o$ is calculated, and this absolute average value $AVE_m$ is set as a correction amount H of the target d-axis current $I_{dt}$. Accordingly, even in a transient state in which the actual rotational speed $\omega$ changes, the correction of the target d-axis current $I_{dt}$ is made more accurately according to a change in the actual peak current value $I_p$.

Figure 12:
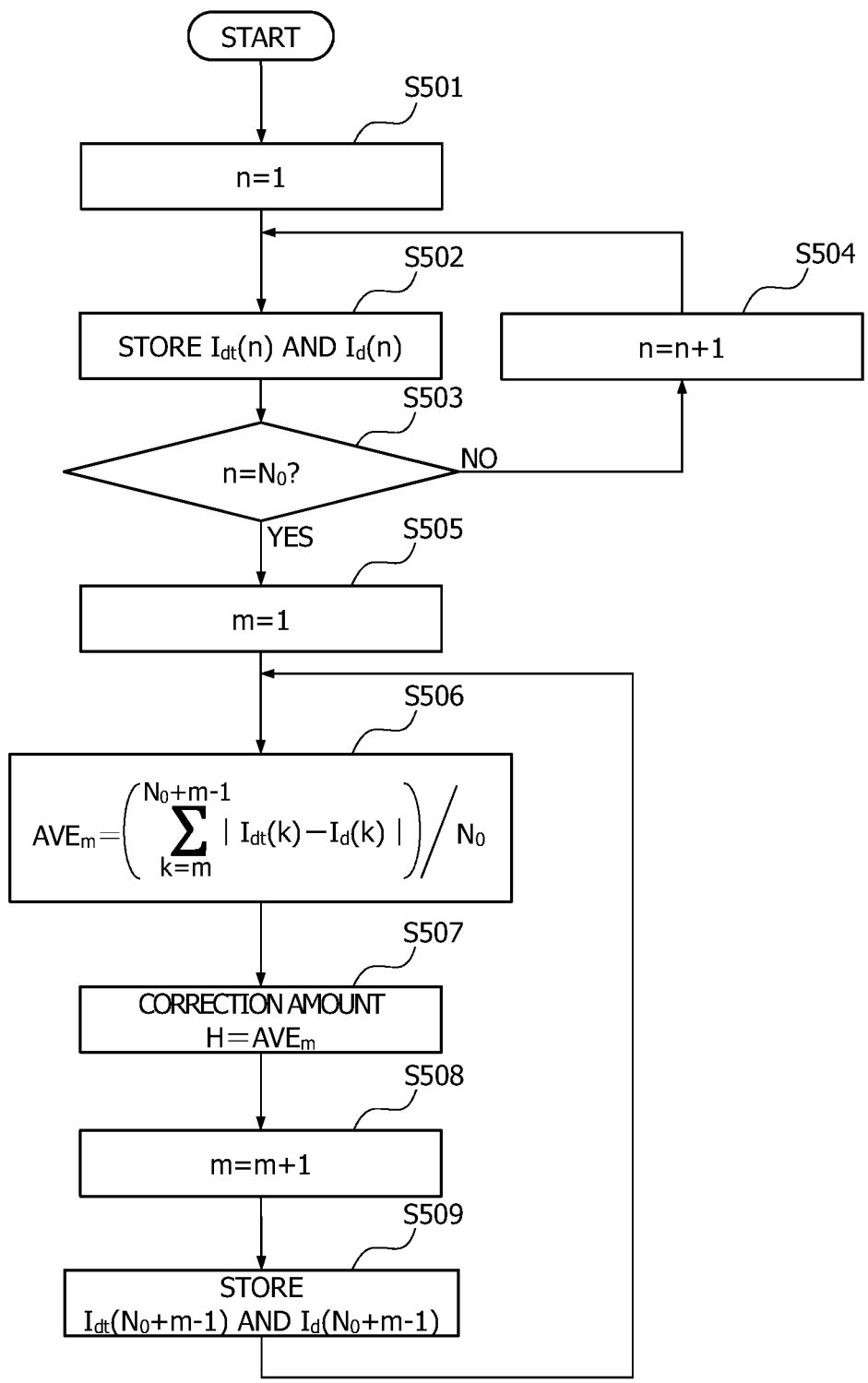
FIG. 12 is a flowchart illustrating a fifth calculation method in the first embodiment.

FIG. 12 is a flowchart illustrating an example of the fifth calculation method of the correction amount H.

Steps S501 to S505 are a process for calculating an absolute average value $AVE_m$ for the first time after the present calculation process starts.

After the period number n is set to 1 as default at step S501, at step S502, the target d-axis current $I_{dt}$ and the actual d-axis current $I_d$ are stored in each calculation period $\Delta t$, and at step S503, it is determined whether or not there are the target d-axis currents $I_{dt}$ and actual d-axis currents $I_d$ corresponding to $N_o$ periods equal to the sample number $N_o$ for the moving average have been stored at the above-described step S502. If it has been determined at step S503 that the target d-axis currents $I_{dt}$ and actual d-axis currents Id corresponding to the $N_o$ periods have been stored (Yes), the process advances to step S505; on the other hand, if it has been determined that the target d-axis currents $I_{dt}$ and actual d-axis currents $I_d$ corresponding to the $N_o$ periods have not been stored (No), the process advances to step S504, and the target d-axis current $I_{dt}$ and the actual d-axis current $I_d$ are further stored in the next calculation period Δt (step S502). Then, at step S505, a period number m indicating a calculation period Δt for the moving average initiated at the next step S506 is set to 1 as default.

At step S506, out of the target d-axis currents $I_{dt}$ and actual d-axis currents Id stored in each calculation period Δt, an absolute average value $AVE_m$ of those corresponding to the latest $N_o$ periods is calculated. The sample number $N_o$ can be changed according to the actual rotational speed ω or the target rotational speed ωt. For example, the higher the actual rotational speed ω or the target rotational speed ωt, the shorter the pulsating period of the peak current value $I_p$ that is likely to be generated, and therefore, the sample number $N_o$ is decreased; on the other hand, the lower the actual rotational speed ω or the target rotational speed ωt, the longer the pulsating period of the peak current value $I_p$ that is likely to be generated, and therefore, the sample number $N_o$ is increased. The other calculation process is specifically the same as steps S105, S205, S305 and S405. Then, at step S507, the absolute average value $AVE_m$ calculated at the above-described step S506 is set as a correction amount H.

At steps S508 and S509, when an absolute average value $AVE_m$ is calculated next at step S506, the period number m is incremented by one to perform a process of eliminating, out of the currently-stored target d-axis currents $I_{dt}$ and actual d-axis currents $I_d$ corresponding to the latest $N_o$ periods, the oldest target d-axis current $I_{dt}$ and actual d-axis current $I_d$ from objects of the moving average (step S508) and a process of including the latest target d-axis current $I_{dt}$ and actual d-axis current $I_d$ having been stored in a calculation period Δt with a period number (m+1) in the objects of the moving average (step S509). After step S509 has been done, the process returns to step S506 to calculate the moving average.

Second Embodiment

Figure 13:
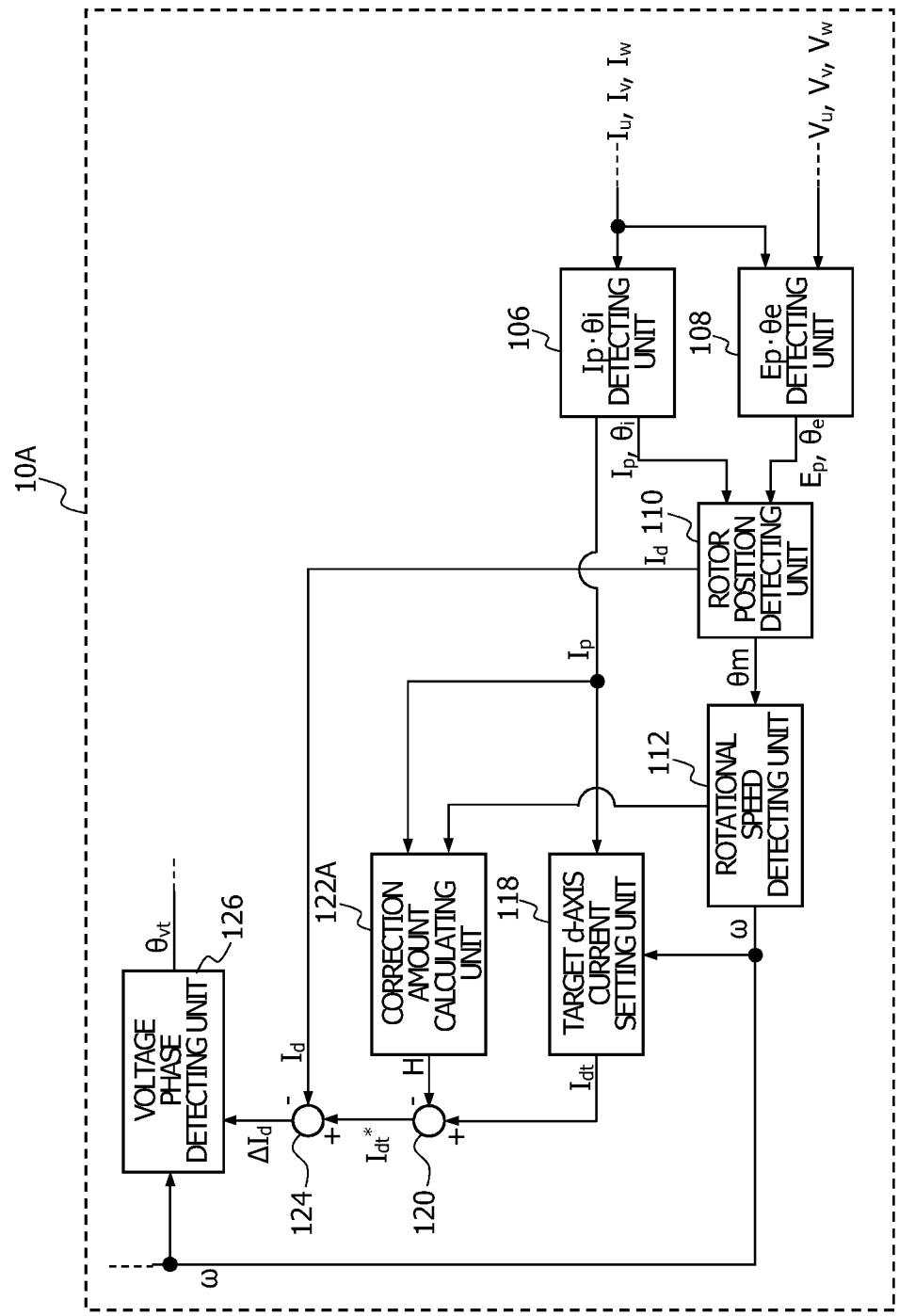
FIG. 13 is a functional block diagram illustrating an example of a motor control device according to a second embodiment.

FIG. 13 is a functional block diagram illustrating an example of a motor control device according to a second embodiment of the present invention. Note that a component common to that of the motor control device 10 according to the first embodiment is assigned the same reference numeral, and description of the component is omitted as much as possible.

A motor control device 10A according to the second embodiment includes a correction amount calculating unit 122A instead of the correction amount calculating unit 122 included in the motor control device 10 according to the first embodiment; the correction amount calculating unit 122A calculates a correction amount H of the target d-axis current $I_{dt}$ based on the current value $I_p$ detected by the Ip·θi detecting unit 106 and the actual rotational speed co detected by the rotational speed detecting unit 112.

In the motor control device 10 according to the first embodiment, the correction amount calculating unit 122 calculates a correction amount H of the target d-axis current $I_{dt}$ based on an average value of the absolute values of deviations between the target d-axis current $I_{dt}$ and the actual d-axis current $I_d$ in a predetermined period of time, and the target d-axis current $I_{dt}$ is corrected by this correction amount H; on the other hand, in the motor control device 10A according to the second embodiment, the correction amount calculating unit 122A calculates (selects) a correction amount H by referring to a correction amount H data table based on the detected peak current value $I_p$ and actual rotational speed ω; the correction amount H data table has stored therein a correction amount H in association with a peak current value and a rotational speed. Therefore, in the second embodiment, the correction amount calculating unit 122A and the second addition/subtraction unit 120 serve as a correction means of correcting the target d-axis current $I_{dt}$ to a corrected target d-axis current $I_{dt}^*$ by the correction amount H.

In the correction amount H data table that the correction amount calculating unit 122A refers to in the calculation (selection) of a correction amount H, a correction amount H that suppress the pulsation of the peak current value $I_p$ is set to a peak current value and a rotational speed based on results of experiments, simulations, or the like.

For example, in a case in which an object to be driven by the motor 12 is a compressor, because of the characteristics of the compressor, the pulsation tends to increase with increase in the peak current value; therefore, the higher the peak current value becomes, the larger the correction amount H is set to.

Furthermore, load torque of the motor 12 can be estimated from a peak current value and a rotational speed, and the pulsation of the peak current value is more likely to be generated as the load torque becomes higher; therefore, if the peak current value is the same, a correction amount H may be increased with increase in load torque estimated from a peak current value and a rotational speed.

According to the motor control device 10A in the second embodiment, just like the first embodiment, the pulsation of the peak current value $I_p$ is suppressed, and the maximum peak current value $I_{pmax}$ is reduced; therefore, it is possible to improve motor efficiency of the motor 12 and reduce impact on the inverter 16, an external device, etc. as well as to reduce processing load in a calculation process because correction amounts H have been stored in the data table in advance.

Third Embodiment

Figure 14:
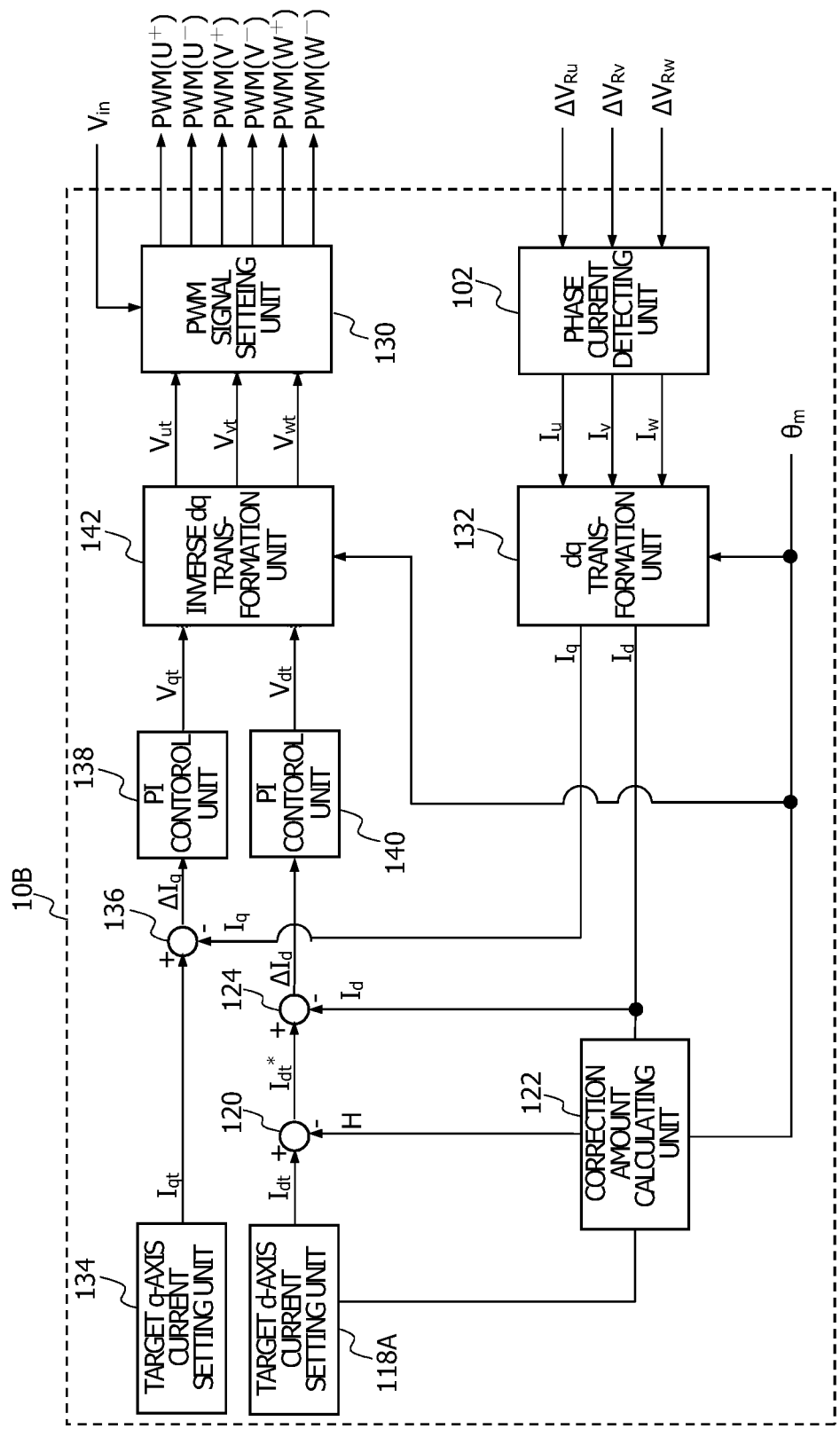
FIG. 14 is a functional block diagram illustrating an example of a motor control device according to a third embodiment.

FIG. 14 is a functional block diagram illustrating an example of a motor control device according to a third embodiment of the present invention.

A motor control device 10B according to the third embodiment is configured to perform more basic vector control than the motor control device 10 according to the first embodiment, and the same correction amount calculating unit 122 as that of the first embodiment is incorporated in the motor control device 10B.

In the motor control device 10B, the phase current detecting unit 102 (a current detecting means) detects phase currents $I_u$, $I_v$, and $I_w$ based on three signals of voltage drops $\Delta V_{Ru}$, $\Delta V_{Rv}$, and $\Delta V_{Rw}$, and a dq transformation unit (a d-axis current detecting means) 132 transforms the detected phase currents $I_u$, $I_v$, and $I_w$ into a d-axis current $I_d$ and a q-axis current $I_q$ using a rotor position $\theta_m$ detected by an arbitrary method.

A target q-axis current setting unit 134 sets a target q-axis current $I_{qt}$ by using an arbitrary method, and, to perform current feedback control, a fourth addition/subtraction unit 136 calculates a q-axis current deviation $\Delta I_q$ that is a deviation between a target q-axis current $I_{qt}$ and an actual q-axis current $I_q$, and a PI control unit 138 performs PI control based on the q-axis current deviation $\Delta I_q$, whereby a q-axis application set voltage $V_{qt}$ is calculated.

A target d-axis current $I_{dt}$ set by an arbitrary method in a target d-axis current setting unit (a target d-axis current setting means) 118A is, in the second addition/subtraction unit 120, corrected to a corrected target d-axis current $I_{dt}$* by subtracting a correction amount H calculated by the correction amount calculating unit 122 from the target d-axis current $I_{dt}$, and further, to perform current feedback control, the third addition/subtraction unit 124 calculates a d-axis current deviation $\Delta I_d$ that is a deviation between the corrected target d-axis current $I_{dt}$* and an actual d-axis current $I_d$. Then, a PI control unit (an applied voltage setting means) 140 performs PI control based on the d-axis current deviation $\Delta I_d$, whereby a d-axis application set voltage $V_{dt}$ is calculated.

Using a rotor position $\theta_m$, an inverse dq transformation unit 142 transforms the q-axis application set voltage $V_{qt}$ and the d-axis application set voltage $V_{dt}$ on the dq coordinate system into application set voltages of three-phase coordinate system, a U-phase application set voltage $V_{ut}$ applied to the U-phase coil Cu of the motor 12, a V-phase application set voltage $V_{vt}$ applied to the V-phase coil Cv, and a W-phase application set voltage $V_{wt}$ applied to the W-phase coil Cw.

Also in the motor control device 10B according to the third embodiment, the correction amount calculating unit 122 calculates a correction amount H by implementing any one of the above-described first to fifth calculation methods; therefore, it is possible to suppress the pulsation of the peak current value $I_p$ and reduce the maximum peak current value $I_{pmax}$.

Fourth Embodiment

Figure 15:
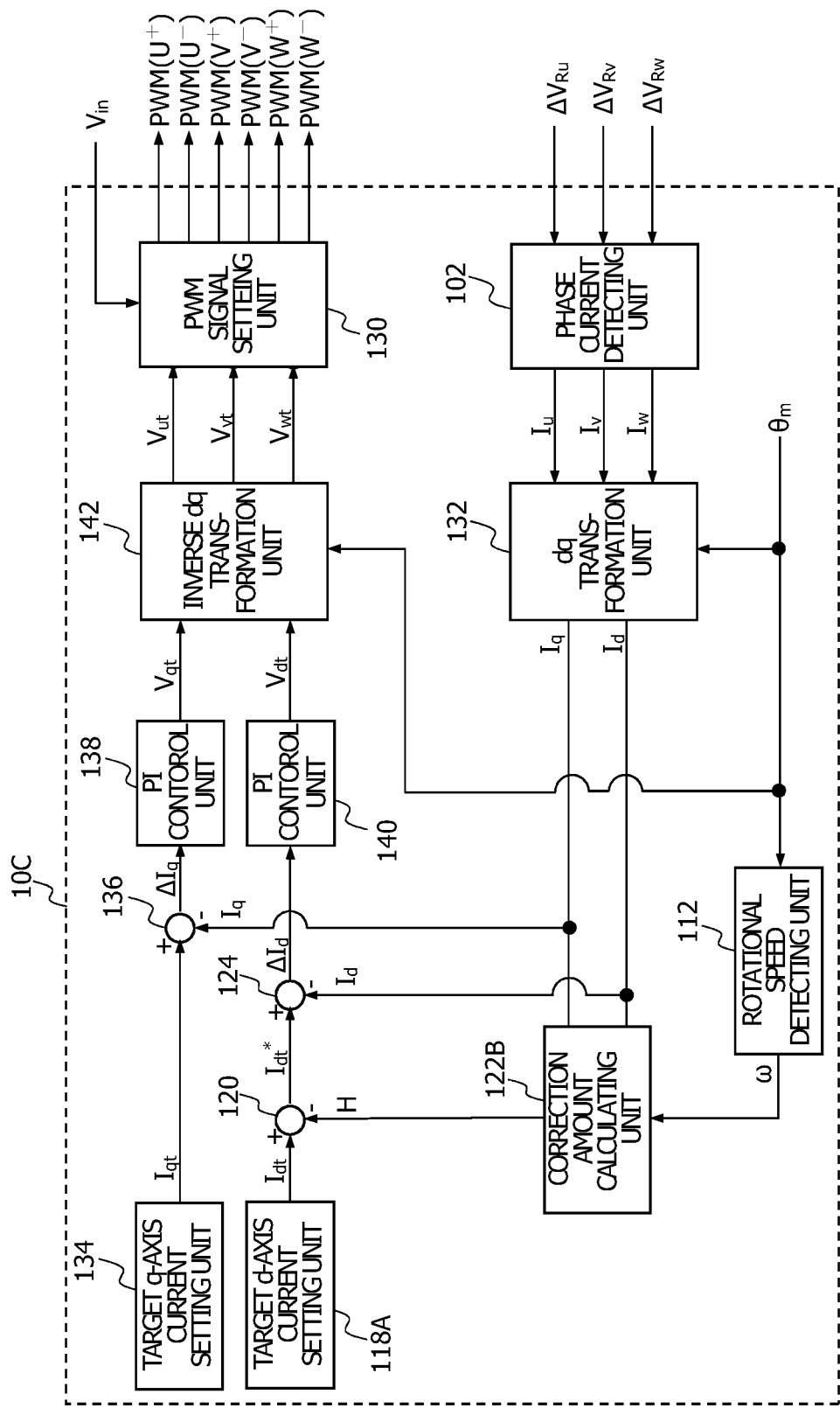
FIG. 15 a functional block diagram illustrating an example of a motor control device according to a fourth embodiment.

FIG. 15 is a functional block diagram illustrating an example of a motor control device according to a fourth embodiment of the present invention.

A motor control device 10C according to the fourth embodiment differs from the configuration of the motor control device 10B according to the third embodiment in that, the motor control device 10C further includes the rotational speed detecting unit 112 that detects an actual rotational speed ω, and, instead of the correction amount calculating unit 122, includes a correction amount calculating unit 122B similar to the correction amount calculating unit 122A in the second embodiment.

That is, based on a peak current value $I_p$ and an actual rotational speed co, the correction amount calculating unit 122B calculates (selects) a correction amount H by referring to the correction amount H data table in which a correction amount H has been stored in advance in association with a peak current value and a rotational speed.

In the motor control device 10C, unlike the motor control device 10A in the second embodiment, the correction amount calculating unit 122B detects a peak current value $I_p$ using the following equation, $I_p=(I_q^2+I_d^2)^{1/2}$, based on an actual q-axis current $I_q$ and d-axis current $I_d$ transformed by the dq transformation unit 132, and the correction amount calculating unit 122B serves as a peak current value detecting means as well.

Then, based on the detected peak current value $I_p$ and the actual rotational speed co detected by the rotational speed detecting unit 112, the correction amount calculating unit 122B calculates (selects) a correction amount H by referring to the correction amount H data table, and corrects a target d-axis current $I_{dt}$ by this correction amount H.

Also in the motor control device 10C according to the fourth embodiment, just like the second embodiment, the pulsation of the peak current value $I_p$ is suppressed, and the maximum peak current value $I_{pmax}$ is reduced; therefore, it is possible to improve motor efficiency of the motor 12 and reduce impact on the inverter 16, an external device, etc. as well as to reduce processing load in a calculation process because correction amounts H have been stored in the data table in advance.

Note that in the first and third embodiments, the calculation of a correction amount H by the correction amount calculating unit 122 is performed constantly; alternatively, instead of this, the correction amount calculating unit 122 can initiate the calculation of a correction amount H according to the magnitude of pulsation of the peak current value $I_p$. For example, when a difference between the maximum value and the minimum value of peak current values $I_p$ detected by the Ip·θi detecting unit 106 of the motor control device 10 has become a predetermined value or more, the correction amount calculating unit 122 may initiate the calculation of a correction amount H.

Furthermore, in the second and fourth embodiments, the calculation of a correction amount H by the correction amount calculating units 122A and 122B is performed constantly; alternatively, instead of this, the correction amount calculating units 122A and 122B can be configured to perform the calculation of a correction amount H according to the magnitude of pulsation of the peak current value $I_p$. For example, when a peak current value $I_p$ detected by the Ip·θi detecting unit 106 of the motor control device 10A has become a predetermined value or more, the correction amount calculating unit 122A may perform the calculation of a correction amount H. Alternatively, on the correction amount H data table, the correction amount H may be set to 0 if the peak current value $I_p$ is less than the predetermined value.

REFERENCE SYMBOL LIST 10, 10A, 10B, 10C Motor control device
12 Motor
102 Phase current detecting unit
106 Ip·θi detecting unit
110 Rotor position detecting unit
112 Rotational speed detecting unit
118, 118A Target d-axis current setting unit
120 Second addition/subtraction unit
122, 122A, 122B Correction amount calculating unit
124 Third addition/subtraction unit
126 Voltage phase detecting unit
128 Phase voltage setting unit
132 dq transformation unit
140 PI control unit
$I_u$, $I_v$, $I_w$ Phase current
$I_{dt}$ Target d-axis current
$I_d$ Actual d-axis current
$\Delta I_d$ Deviation between target d-axis current and actual d-axis current
$\theta_{vt}$ Voltage phase
$V_{pt}$ Peak voltage value
AVE, $AVE_m$ Absolute average value
H Correction amount of target d-axis current
$\theta_m$ Rotor position
ω Actual rotational speed
$I_p$ Peak current value

The invention claimed is:
1. A motor control device comprising:
a current detecting means that detects a phase current of a motor;
a target d-axis current setting means that sets a target d-axis current;

a d-axis current detecting means that detects an actual d-axis current from the phase current detected by the current detecting means;

an applied voltage setting means that sets an applied voltage to be applied to the motor based on a deviation between the target d-axis current and the actual d-axis current; and a correction means that calculates an average value of deviations between the target d-axis current and the actual d-axis current in each predetermined period of time, and corrects the target d-axis current based on the average value.

2. The motor control device according to claim 1, wherein the predetermined period of time is one period of mechanical angle of the motor.

3. The motor control device according to claim 1, wherein the predetermined period of time is set according to a rotational speed of the motor.

4. The motor control device according to claim 1, wherein the average value is calculated by moving average.

5. A motor control device comprising:

a current detecting means that detects a phase current of a motor;

a target d-axis current setting means that sets a target d-axis current;

a d-axis current detecting means that detects an actual d-axis current from the phase current detected by the current detecting means;

an applied voltage setting means that sets an applied voltage to be applied to the motor based on a deviation between the target d-axis current and the actual d-axis current;

a peak current value detecting means that detects a peak current value;

a rotational speed detecting means that detects a rotational speed; and a correction means that selects, out of correction amounts of target d-axis currents stored in advance in association with a peak current value and a rotational speed, a correction amount corresponding to the peak current value detected by the peak current value detecting means and the rotational speed detected by the rotational speed detecting means, and corrects the target d-axis current by the selected correction amount.

6. The motor control device according to claim 5, wherein the correction means performs correction of the target d-axis current according to the peak current value detected by the peak current value detecting means.

* * * * *